(12) United States Patent
Rogers

(10) Patent No.: US 11,067,465 B2
(45) Date of Patent: *Jul. 20, 2021

(54) PRESSURE SENSOR ASSEMBLIES WITH ANTENNA ARRAYS

(71) Applicant: THE BOEING COMPANY, Chicago, IL (US)

(72) Inventor: John E. Rogers, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 234 days.

This patent is subject to a terminal disclaimer.

(21) Appl. No.: 16/443,299

(22) Filed: Jun. 17, 2019

(65) Prior Publication Data
US 2020/0393317 A1 Dec. 17, 2020

(51) Int. Cl.
*G01L 19/08* (2006.01)
*H01Q 21/00* (2006.01)

(52) U.S. Cl.
CPC .......... *G01L 19/086* (2013.01); *G01L 19/083* (2013.01); *H01Q 21/0006* (2013.01)

(58) Field of Classification Search
None
See application file for complete search history.

(56) References Cited

U.S. PATENT DOCUMENTS

| 4,780,724 A * | 10/1988 | Sharma | H01Q 9/0442 333/104 |
| 9,772,422 B2 | 9/2017 | Hull | |
| 2013/0342186 A1 | 12/2013 | Pagani | |
| 2018/0372563 A1 | 12/2018 | Rogers | |

OTHER PUBLICATIONS

Extended European Search Report for EP 20178025.1-1001, dated Oct. 23, 2020.
Fonseca, M. A., et al., "Flexible wireless passive pressure sensors for biomedical applications," Hilton Head 2006, Jun. 2006.
Abad, E., et al., "Flexible tag microlab development: gas sensors integration in RFID flexible tags for food logistics," Sensors and Actuators B, Jul. 2007.

(Continued)

*Primary Examiner* — Peter J Macchiarolo
*Assistant Examiner* — Jermaine L Jenkins
(74) *Attorney, Agent, or Firm* — The Small Patent Law Group LLC; Joseph M. Butscher

(57) ABSTRACT

A pressure sensor assembly and pressure sensing method include a first receive antenna array configured to receive a first signal at a first frequency, a second receive antenna array configured to receive a second signal at a second frequency that differs from the first frequency, and a diode coupled to the first receive antenna array and the second receive antenna array. The diode is configured to receive the first signal at the first frequency and the second signal at the second frequency and output a third signal at a third frequency that is a difference between the first frequency and the second frequency. A transmit antenna array is coupled to the diode. The transmit antenna array is configured to receive the third signal at the third frequency and output the third signal at the third frequency.

40 Claims, 12 Drawing Sheets

(56) References Cited

OTHER PUBLICATIONS

Rida, A., et al., "Conductive inkjet-printed antennas on flexible low-cost paper-based substrates for RFID and WSN applications," IEEE Antennas and Propagation Magazine, Jun. 2009.

Schwerdt, H. N., et al., "A fully passive wireless microsystem for recording of neuropotentials using RF backscattering methods," Journal of Microelectromechanical Systems, Aug. 2011.

Rose, D. P., et al., "Adhesive RFID sensor patch for monitoring of sweat electrolytes," IEEE Transactions on Biomedical Engineering, Jun. 2015.

Bito, J., et al., "Ambient RF energy harvesting from a two-way talk radio for flexible wearable wireless sensor devices utilizing inkjet printing technologies," IEEE Transactions on Microwave Theory and Techniques, Dec. 2015.

Escobedo, P., et al., "Flexible passive near field communication tag for multigas sensing," Analytical Chemistry, Dec. 2016.

Xu, G., et al., "Passive and wireless near field communication tag sensors for biochemical sensing with smartphone," Sensors and Actuators B, Feb. 2017.

Pozar, D.M., "Microstrip antenna aperture-coupled to a microstrip line," Electronics Letters, Jan. 1985.

Pozar, D.M., Kaufman, B., "Increasing the bandwidth of a microstrip antenna by proximity coupling," Electronics Letters, Apr. 1987.

Hallil, H., et al., "Feasibility of wireless gas detection with an FMCW RADAR interrogation of passive RF gas sensor," IEEE Sensors, Nov. 2010.

Iwasaki, H., "A circularly polarized small-size microstrip antenna with a cross slot," IEEE Transactions on Antennas and Propagation, Oct. 1996.

Papapolymerou, I., et al., "Micromachined patch antennas," IEEE Transactions on Antennas and Propagation, Feb. 1998.

Gauthier, G.P., et al., "A 94 GHz aperture-coupled micromachined microstrip antenna," IEEE Transactions on Antennas and Propagation, Dec. 1999.

Cook, B.S., et al., "Multilayer inkjet printing of millimeter-wave proximity-fed patch arrays on flexible substrates," IEEE Antennas and Wireless Propagation Letters, Oct. 2013.

Sorkherizi, M.S., et al., "Planar high-efficiency antenna array using new printed ridge gap waveguide technology," IEEE Transactions on Antennas and Propagation, Jul. 2017.

Yi, X., et al., "Passive wireless smart-skin sensor using RFID-based folded patch antennas," International Journal of Smart and Nano Materials, Mar. 2011.

Zhang, N., et al., "Temperature sensor based on 4H-silicon carbide pn diode operational from 20C to 600C," Applied Physics Letters, Feb. 2014.

Rogers, J.E., et al., "A passive wireless microelectromechanical pressure sensor for harsh environments," Journal of Microelectromechanical Systems, Feb. 2018.

* cited by examiner

PRESSURE SENSOR ASSEMBLIES WITH ANTENNA ARRAYS

FIELD OF EMBODIMENTS OF THE DISCLOSURE

Embodiments of the present disclosure generally relate to systems and methods for sensing pressure generated in relation to components, such as aircraft engines, and, more particularly, to pressure sensor assemblies, such as microelectromechanical pressure sensor assemblies.

BACKGROUND OF THE DISCLOSURE

Microphones are commonly used to measure sound pressure levels within one or more acoustic bandwidths of interest. For example, in various aeronautical and aerospace vehicles, microphones may be used to measure sound pressure levels within engines. The sound pressure levels detected by a microphone may be used to monitor engine performance. For example, the sound pressure levels may be analyzed to detect potential irregularities.

Existing microphones include internal (or local) electronics for signal processing. However, such electronics may not be able to effectively operate at elevated temperatures, such as may be generated within engines of an aircraft. As an alternative, optical-based microphones may be used. However, while optical-based microphones are generally able to operate at higher temperatures, many known optical-based microphones are expensive, and typically difficult to package. Further, optical-based microphones are connected to fibers, which may limit areas where they can be placed.

SUMMARY OF THE DISCLOSURE

A need exists for an improved sensor and method for detecting pressure, such as within an engine of an aircraft.

With that need in mind, certain embodiments of the present disclosure provide a pressure sensor assembly including a first receive antenna array configured to receive a first signal at a first frequency, and a second receive antenna array configured to receive a second signal at a second frequency that differs from the first frequency. A diode is coupled to both the first receive antenna array and the second receive antenna array. The diode is configured to receive the first signal at the first frequency and the second signal at the second frequency and output a third signal at a third frequency that is a difference between the first frequency and the second frequency. A transmit antenna array is coupled to the diode. The transmit antenna array is configured to receive the third signal at the third frequency and output the third signal at the third frequency.

In at least one embodiment, the pressure sensor assembly also includes a first substrate. The first receive antenna array, the second receive antenna array, and the transmit antenna array are disposed on the first substrate.

In at least one example, the pressure sensor assembly also includes a first microstrip feed that connects the transmit antenna array to the diode, and a second microstrip feed that connects the first receive antenna array and the second receive antenna array to the diode.

The first receive antenna array and the second receive antenna array may operate in a W-band, and the transmit antenna array may operate in an X-band.

The diode may be a p-n junction diode, a PIN diode, a Schottky diode, a Zener diode, or a tunnel diode. One or more of the first receive antenna array, the second receive antenna array, or the transmit antenna array may be edge-fed in relation to the diode. One or more of the first receive antenna array, the second receive antenna array, or the transmit antenna array may be proximity-coupled in relation to the diode.

In at least one embodiment, at least one cavity is disposed within at least one substrate underneath at least a portion of one or more of the first receive antenna array, the second receive antenna array, or the transmit antenna array. For example, a first cavity may be within the substrate(s) underneath at least a portion of one or both of the first receive antenna array or the second receive antenna array.

In at least one embodiment, a vent channel is formed through and extending within the substrate(s). The vent channel is fluidly connected to the first cavity. A vent outlet is formed within the substrate(s). The vent outlet is fluidly connected to the vent channel.

As another example, a first cavity is within the substrate(s) underneath at least a portion of the transmit antenna array. As another example, a first cavity is within the substrate(s) underneath at a least a portion of one or both of the first receive antenna array or the second receive antenna array, and a second cavity is within the substrate(s) underneath at least a portion of the transmit antenna array.

In at least one embodiment, at least one diaphragm is positioned over the cavity.

In at least one embodiment, a first substrate is a P-type doped semiconductor substrate. A first N-type impurity is doped on the first substrate. A second N-type impurity is doped on the first N-type impurity to form, at least in part, the diode. An oxidation layer is deposited over the first substrate. A metal is deposited over the oxidation layer to form the first receive antenna array, the second receive antenna array, a first microstrip feed, a second microstrip feed, the transmit antenna array, and electrical contacts. A first cavity, a vent channel, and a vent outlet are formed into the first substrate. A backside ground plane is deposited onto the second substrate. The second substrate is bonded to the first substrate.

In at least one embodiment, a first substrate is an intrinsic semiconducting substrate. The first substrate is doped with a first P-type impurity. A first N-type impurity is doped over a portion of the first P-type impurity on the first substrate. A second P-type impurity is doped over a portion of the first N-type impurity to define, at least in part, the diode. A passivation layer is deposited over the first substrate. A first metal layer forms electronic contacts deposited over the passivation layer. A second metal layer forms a microstrip feed network deposited over the first metal layer. A third metal layer forms a backside ground plane deposited on the first substrate opposite from the second metal layer. A fourth metal layer forms the first receive antenna array, the second receive antenna array, and the transmit antenna array on a second substrate. At least one cavity is formed in the first substrate or the second substrate.

Certain embodiments of the present disclosure provide a pressure sensing method that includes providing a first receive antenna array that receives a first signal at a first frequency, providing a second receive antenna array that receives a second signal at a second frequency that differs from the first frequency, coupling a diode to the first receive antenna array and the second receive antenna array, coupling a transmit antenna array to the diode, receiving (by the diode) the first signal at the first frequency and the second signal at the second frequency, outputting (by the diode) a third signal at a third frequency that is a difference between the first frequency and the second frequency, receiving (by the transmit antenna array from the diode) the third signal at the third frequency, and outputting (by the transmit antenna array) the third signal at the third frequency.

In at least one embodiment, the outputting, by the transmit antenna array, includes outputting the third signal at the third frequency to a receiver. The pressure sensing method further includes determining, by the receiver, a pressure level from the third signal at the third frequency.

In at least one embodiment, the pressure sensing method also includes disposing the first receive antenna array, the second receive antenna array, and the transmit antenna array on a first substrate.

In at least one embodiment, the pressure sensing method also includes connecting, by a first microstrip feed, the transmit antenna array to the diode, and connecting, by a second microstrip feed, the first receive antenna array and the second receive antenna array to the diode.

The pressure sensing method may also include operating the first receive antenna array and the second receive antenna array in a W-band, and operating the transmit antenna array in an X-band.

The pressure sensing method may also include disposing at least one cavity within at least one substrate underneath at least a portion of one or more of the first receive antenna array, the second receive antenna array, or the transmit antenna array. Further, the pressure sensing method may include forming a vent channel within the at least one substrate, wherein the vent channel is fluidly connected to the at least one cavity, and forming a vent outlet within the at least one substrate, wherein the vent outlet is fluidly connected to the vent channel.

The pressure sensing method may also include positioning at least one diaphragm over the at least one cavity.

In at least one embodiment, the pressure sensing method further includes providing a first substrate that is a P-type doped semiconductor substrate, doping a first N-type impurity on the first substrate, doping a second N-type impurity on the first N-type impurity to form, at least in part, the diode, depositing an oxidation layer over the first substrate, depositing a metal over the oxidation layer to form the first receive antenna array, the second receive antenna array, a first microstrip feed, a second microstrip feed, the transmit antenna array, and electrical contacts, laser etching a first cavity, a vent channel, and a vent outlet into the first substrate, depositing a backside ground plane onto a second substrate, and/or bonding the second substrate to the first substrate.

In at least one embodiment, the pressure sensing method includes providing a first substrate that is an intrinsic semiconducting substrate, doping the first substrate with a first P-type impurity, doping a first N-type impurity over a portion of the first P-type impurity on the first substrate, doping a second P-type impurity over a portion of the first N-type impurity to define, at least in part, the diode, depositing a passivation layer over the first substrate, depositing a first metal layer over the passivation layer to form electronic contacts, depositing a second metal layer over the first metal layer to form a microstrip feed network, depositing a third metal layer on the first substrate opposite from the second metal layer to form a backside ground plane, depositing a fourth metal layer on a second substrate to form the first receive antenna array, the second receive antenna array, and the transmit antenna array, and/or forming at least one cavity in the first substrate or the second substrate. The forming the at least one cavity step may include forming a first cavity formed in the first substrate underneath at least a portion of the transmit antenna array, and forming a second cavity in the second substrate underneath at least a portion of one or both of the first receive antenna array or the second receive antenna array. The pressure sensing method may also include bonding the first substrate to the second substrate.

Certain embodiments of the present disclosure provide a pressure sensing method that includes receiving (by a first receive antenna array) a first signal at a first frequency, receiving (by a second receive antenna array) a second signal at a second frequency that differs from the first frequency, receiving (by a diode) the first signal at the first frequency and the second signal at the second frequency, outputting (by the diode) a third signal at a third frequency that is a difference between the first frequency and the second frequency, receiving (by a transmit antenna array from the diode) the third signal at the third frequency, and outputting (by the transmit antenna array) the third signal at the third frequency.

DETAILED DESCRIPTION OF THE DISCLOSURE

Figure 1:
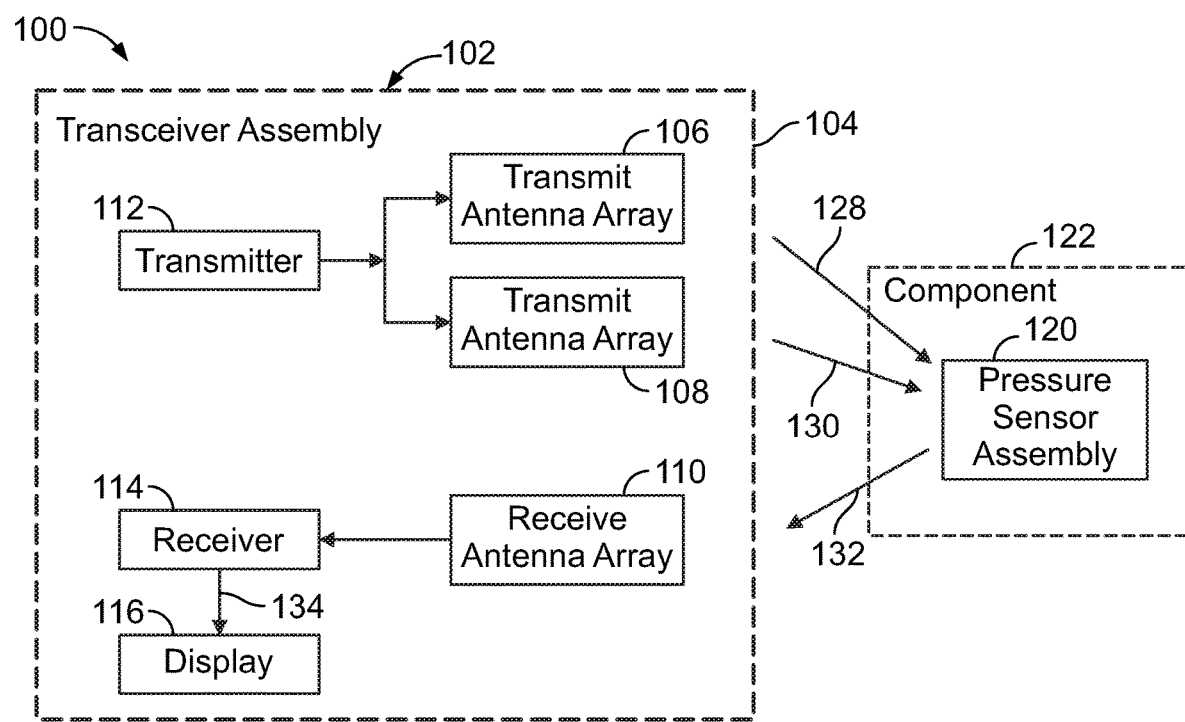
FIG. 1 illustrates a schematic box diagram of a pressure sensing system, according to an embodiment of the present disclosure.

The foregoing summary, as well as the following detailed description of certain embodiments, will be better understood when read in conjunction with the appended drawings.

As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a pressure sensor assembly. The pressure sensor assembly may be passive in that it may not include an internal energy source, such as a battery. The pressure sensor assembly is also configured to wirelessly operate. In at least one embodiment, the pressure sensor assembly is configured to operate in the far-field and is interrogated with linear or circular electromagnetic plane waves in two frequency bands. A portion of the incident electromagnetic plane waves is reflected back at a difference frequency to a receiver. The signal is then processed to determine the sound pressure level within an acoustic bandwidth of interest. The pressure sensor may be fabricated using subtractive (for example, milling, wet etching, and/or laser etching) and additive (for example, printing or film deposition) methods. In at least one embodiment, the pressure sensor assembly may be formed of materials that are able to withstand elevated temperatures, such as temperatures generated within engines of aircraft. For example, the pressure assembly may include antennas formed of platinum or titanium, and one or more substrates formed of silicon carbide. In general, the pressure sensor assembly is capable of operating in harsh environments, such as high temperatures, corrosive, and/or radiative environments.

In at least one embodiment, the pressure sensor assembly includes circularly polarized antennas, which minimize or otherwise reduce power loss between the pressure sensor assembly and a transceiver. The pressure sensor assembly includes a first receive antenna array and a second receive antenna array for receiving signals (such as radio frequency signals) at two different frequencies. The pressure sensor assembly also includes a third antenna array (a transmit antenna array) for broadcasting a signal at a frequency that is the difference between the two frequencies of the received signals. In at least one embodiment, the pressure sensor assembly also includes an integrated diode (for example, a high temperature, high frequency diode) for producing a difference frequency. The pressure sensor assembly may be adapted to linearly polarized and circularly polarized antenna types.

Certain embodiments of the present disclosure provide a pressure sensor assembly that includes a first receive antenna array configured to receive a first signal at a first frequency, a second receive antenna array configured to receive a second signal at a second frequency that differs from the first frequency, and a diode coupled to (for example, electrically connected to) the first receive antenna array and the second receive antenna array. The diode is configured to receive the first signal at the first frequency and the second signal at the second frequency and output a third signal at a third frequency that is a difference between the first frequency and the second frequency. A transmit antenna array is also coupled to (for example, electrically connected to) the diode. The transmit antenna array is configured to receive the third signal at the third frequency and output the third signal at the third frequency to a transceiver assembly configured to determine a pressure level (such as a sound pressure level) from the third signal at the third frequency. In at least one embodiment, the pressure sensor assembly also includes at least one acoustic cavity disposed within at least one substrate underneath at least a portion of one or more of the first receive antenna array, the second receive antenna array, or the transmit antenna array.

FIG. 1 illustrates a schematic box diagram of a pressure sensing system 100, according to an embodiment of the present disclosure. The pressure sensing system 100 includes a transceiver assembly 102 that includes a housing 104 that retains a first transmit antenna array 106, a second transmit antenna array 108 and a receive antenna array 110. The first transmit antenna array 106 and the second transmit antenna array 108 are coupled to (for example, electrically connected to) a transmitter 112, such as through one or more wired or wireless connections. The receive antenna array 110 is coupled to (for example, electrically connected to) a receiver 114, such as through one or more wired or wireless connections. The receiver is coupled to (for example, electrically connected to) a display 116, such as through one or more wired or wireless connections. The display 116 may be a monitor, screen (such as a digital, light emitting diode (LED), liquid crystal display (LCD) screen, or the like), a touchscreen interface, and/or the like.

The pressure sensing system 100 also includes a pressure sensor assembly 120 that is configured to detect pressure, such as sound pressure, generated by, within, or otherwise near a component 122. In at least one embodiment, the pressure sensor assembly 120 is mounted to a portion of the component 122. In at least one embodiment, the pressure sensor assembly 120 is within the component 122. In at least one embodiment, the pressure sensor assembly 120 is separated from the component 122. For example, the pressure sensor assembly 120 may be mounted proximate to (such as within 10 feet or less) of the component 122. The component 122 may be various structures, devices, assemblies, systems, or the like that generate sound pressure or otherwise reside in a sound pressure environment. For example, the component 122 may be an engine of an aircraft. In at least one other embodiment, the component 122 may be a speaker or other such audio device. In at least one other embodiment, the component 122 may be a portion of heating, ventilation, and air conditioning (HVAC) systems. It is to be understood that these are merely examples of components, and that the pressure sensor assembly 120 may be used with respect to any type of component that generates pressure, such as sound pressure, which may be analyzed to determine an operational status of the component.

In operation, the transmitter 112 provides a first time-varying power signal to the first transmit antenna array 106, which in response, transmits a first signal 128 (such as a first RF signal) at a first frequency. Similarly, the transmitter 112 provides a second time-varying power signal to the second transmit antenna array 108, which in response, transmits a second signal 130 (such as a second RF signal) at a second frequency that differs from the first frequency. In at least one embodiment, the first frequency and the second frequency are in a common frequency band. For example, the first frequency may be at 85 GHz, while the second frequency may be at 75 GHz. In at least one other embodiment, the first frequency may be within a first frequency band (for example, W-band), while the second frequency may be within a second frequency band that differs from the first frequency band (for example, K-band).

The first signal 128 and the second signal 130 are transmitted across free space and interact with the pressure sensor assembly 120 such that the pressure sensor assembly 120 transmits a third signal 132, such as a third radio frequency signal (which is transmitted at a third frequency that is a difference between the first frequency of the first signal 128 and the second frequency of the second signal 130). As an example, if the first signal 128 is at 85 GHz, and the second signal 130 is at 75 GHz, the pressure sensor assembly 120 transmits or otherwise outputs the third signal 132 at 10 GHz.

The receive antenna array 110 of the transceiver assembly 102 receives the third signal 132. As the third signal 132 is received by the receive antenna array 110, a third time-varying power signal is generated at the receiver 114. By receiving the third signal 132 at the third frequency, which is the difference between the first frequency of the first signal 128 and the second frequency of the second signal 130, the receiver 114 is able to detect pressure (such as sound pressure) generated in relation to (for example, by, within, at, or near) the component 122, as described herein. The receiver 114 outputs a signal 134 to the display 116, which, in turn, shows an indication of the pressure generated by the component 122 and detected by the pressure sensor assembly 120. Optionally, the receiver 114 may be coupled to (for example, electrically connected to) an audio device, such as a speaker, which emits an audio signal in response to reception of the signal 134 to indicate the pressure generated in relation to the component 122.

Figure 2:
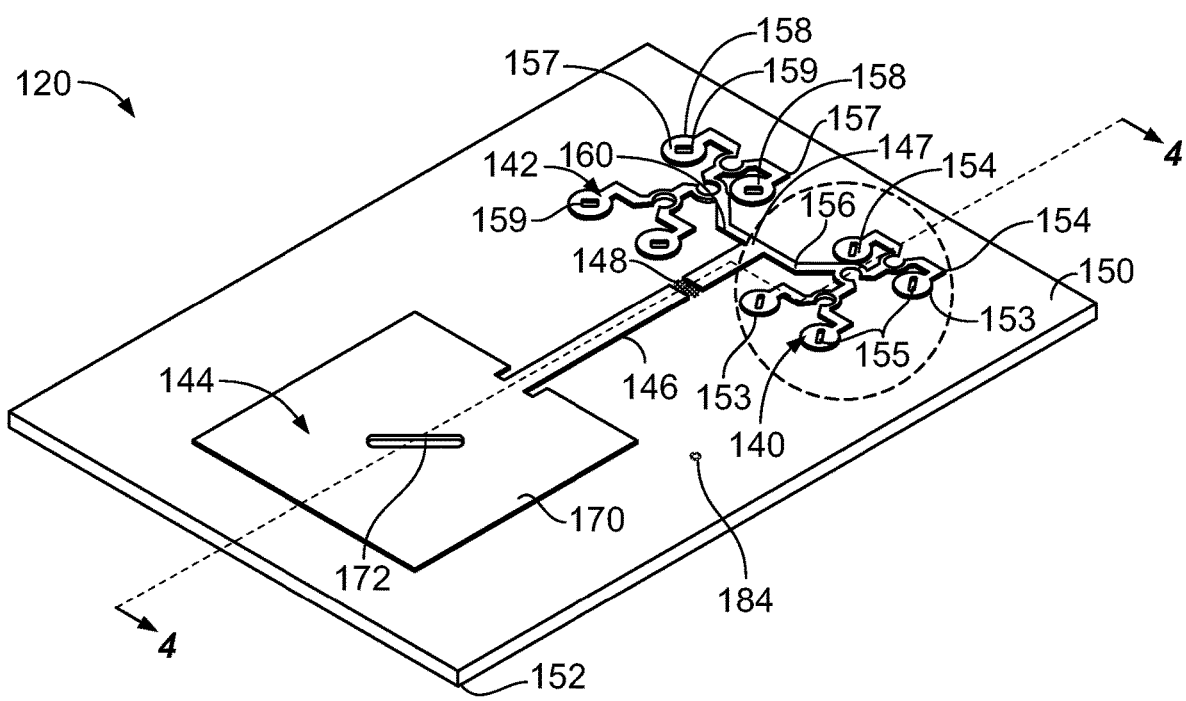
FIG. 2 illustrates a perspective top view of a pressure sensor assembly, according to an embodiment of the present disclosure.

FIG. 2 illustrates a perspective top view of the pressure sensor assembly 120, according to an embodiment of the present disclosure. The pressure sensor assembly 120 includes a first receive antenna array 140, a second receive antenna array 142, and a transmit antenna array 144 disposed on a substrate 150 (for example, a first substrate), and are coupled to a backside ground plane 152. A first microstrip feed 146 electrically connects the transmit antenna array 144 to a diode 148, which, in turn, electrically connects to a second microstrip feed 147 that electrically connects to the first receive antenna array 140 and the second receive antenna array 142.

In at least one embodiment, the first receive antenna array 140 is a W-band antenna array including antenna elements 154 (for example, four antenna elements) that electrically connect to the second microstrip feed 147. The first receive antenna array 140 is configured to operate at or near 85 GHz. The antenna elements 154 may include circular main bodies 153 with internal slots 155. As shown, the first receive antenna array 140 includes an edge-fed microstrip feed network 156 that electrically connects to the second microstrip feed 147. Optionally, the first receive antenna array 140 may include more or less antenna elements than shown, having different shapes than shown, which may or may not include internal slots, and may be configured to operate at or near a frequency that is greater or less than 85 GHz. Referring to FIGS. 1 and 2, the first receive antenna array 140 is configured to receive the first signal 128 transmitted at the first frequency by the first transmit antenna array 106.

In at least one embodiment, the second receive antenna array 142 is a W-band antenna array including antenna elements 158 (for example, four antenna elements) that electrically connect to the second microstrip feed 147. The second receive antenna array 142 is configured to operate at or near 75 GHz. The antenna elements 154 may include circular main bodies 157 having internal slots 159. As shown, the second receive antenna array 142 includes an edge-fed microstrip feed network 160 that electrically connects to the second microstrip feed 147. Optionally, the second receive antenna array 142 may include more or less antenna elements than shown, having different shapes than shown, which may or may not include internal slots, and may be configured to operate at or near a frequency that is greater or less than 75 GHz. Referring to FIGS. 1 and 2, the second receive antenna array 142 is configured to receive the second signal 130 transmitted at the second frequency by the second transmit antenna array 108.

In at least one embodiment, the transmit antenna array 144 is an X-band antenna. The transmit antenna array 144 includes a square-shaped antenna element 170 having an internal slot 172. Optionally, the transmit antenna array 144 may be sized and shaped differently than shown. For example, the transmit antenna array 144 may be circular. The antenna element 170 electrically connects to, or otherwise includes, the first microstrip feed 146. Referring to FIGS. 1 and 2, the transmit antenna array 144 is configured to transmit the third signal 132 at the third frequency, which is the difference between the first frequency and the second frequency.

As shown, the diode 148 couples to (for example, electrically connects to) the first microstrip feed 146 and the second microstrip feed 147. Accordingly, the diode 148 is disposed between the transmit antenna array 144 and the first and second receive antenna arrays 140 and 142. The diode 148 is a non-linear device that generates a signal, such as a radio frequency signal, having the third frequency, which is difference between the first frequency of the first signal 128 received by the first receive antenna array 140 and the second frequency of the second signal 130 received by the second receive antenna array 142. As such, the diode 148 is configured to generate the third signal 132, which is received by the transmit antenna array 144 and transmitted to the transceiver assembly 102.

The first and second signals 128 and 130, respectively, are fed to the diode 148 via the second microstrip feed 147. In general, the diode 148 exhibits a switch-like behavior. Consider, for example, a contact switch with an input, an output, and a contact position. A square wave input signal (at a first frequency) with the contact position being turned on and off (at a second frequency) generates a square wave output signal (at any instantaneous time) that corresponds to the overlap between the input signal and the contact position (that is, on or off). Over time, the output signal reveals frequency components including fundamentals, sum and difference terms, harmonics, and intermodulation products. In general, the diode 148 receives the first signal 128 at the first frequency and the second signal 130 at the second frequency, and outputs the third signal 132 at the third frequency (that is, the difference frequency) to the transmit antenna array 144 via the first microstrip feed 146.

The diode 148 may be a p-n junction diode, a PIN diode, a Schottky diode, a Zener diode, or tunnel diode, or the like. For example, the diode 148 may be a p-n junction diode, which has an electrically-capacitive depletion region when no voltage is applied across an anode and cathode of the diode 148. When a voltage is applied across the anode and cathode, electrical current flows therethrough. As another example, the diode 148 may be a Schottky diode, which is similar to the p-n junction diode, but exhibits a lower required voltage to allow current to flow, which thereby results in higher switching performance, and may be well suited for high-frequency applications.

Figure 3:
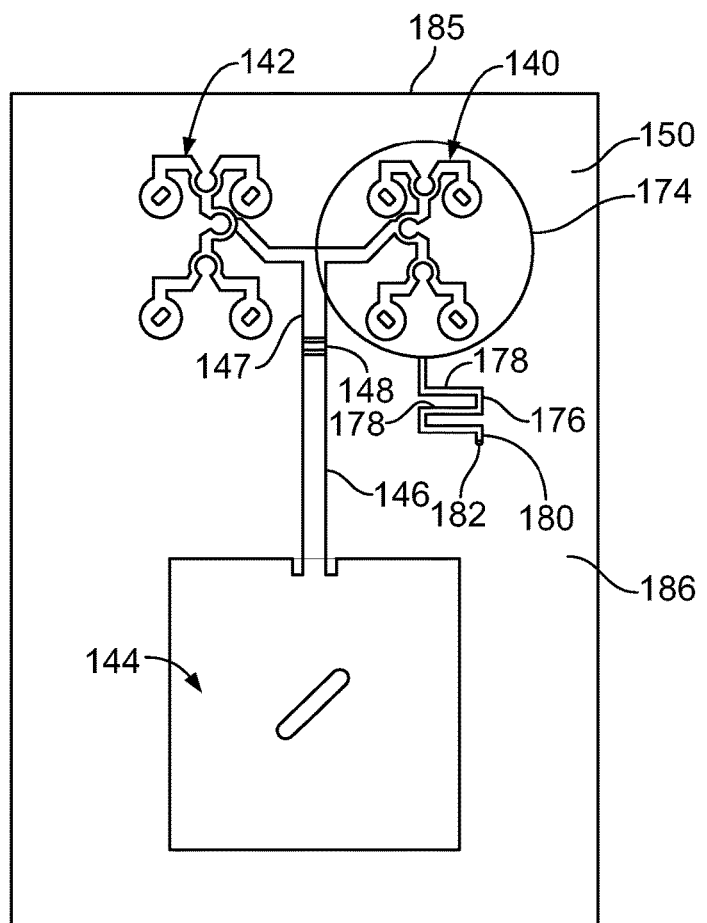
FIG. 3 illustrates a top view of the pressure sensor assembly.

FIG. 3 illustrates a top view of the pressure sensor assembly 120. The substrate 150 is shown as transparent so that internal components are shown. In particular, a circular-shaped cavity 174 (for example, a circular-shaped acoustic cavity) is positioned underneath the first receive antenna array 140. Optionally, the cavity 174 may be sized and shaped differently than shown. For example, the cavity 174 may be square-shaped. The cavity 174 may be formed within the substrate 150. The cavity 174 may extend underneath an entirety of the first receive antenna array 140, and at least a portion of the second microstrip feed 147. Optionally, the cavity 174 may be underneath less than all of the first receive antenna array 140. In at least one other embodiment, the cavity 174 is disposed underneath at least a portion of the second receive antenna array 142. In at least one other embodiment the cavity 174 is disposed underneath at least portions of both the first receive antenna array 140 and the second receive antenna array 142. In at least one other embodiment, the cavity 174 may be disposed underneath at least a portion of the transmit antenna array 144. In at least one other embodiment, a first cavity is disposed underneath at least a portion of one or both of the first receive antenna array 140 and/or the second receive antenna array 142, and a second cavity is disposed underneath at least a portion of the transmit antenna array 144.

The cavity 174 fluidly connects to a vent channel 176 that is formed and extends within the substrate 150. The vent channel 176 may include a series of turns 178. The vent channel 176 may include more or less turns 178 than shown. A terminal end 180 of the vent channel 176 fluidly connects to a vent outlet 182 formed in the substrate 150. The vent outlet 182 includes a vent hole 184 that is formed through an upper surface 186 of the substrate 150.

As shown, the vent outlet 182 may be formed in the substrate 150 between the first receive antenna array 140 and the transmit antenna array 144. Optionally, the vent outlet 182 and the vent channel 176 may be distally away from the transmit antenna array 144, such as toward an edge 185 of the substrate 150.

In at least one embodiment, an optional bandwidth enhancing cavity (such as the cavity 500 shown in FIG. 20) may be formed underneath at least a portion of the transmit antenna array 144. It has been found that the optional bandwidth enhancing cavity underneath the transmit antenna array 144 increases gain and bandwidth of the transmit antenna array 144. A bandwidth enhancing cavity may also be formed underneath at least a portion of one or both of the first receive antenna array 140 and/or the second receive antenna array 142.

Figure 4:
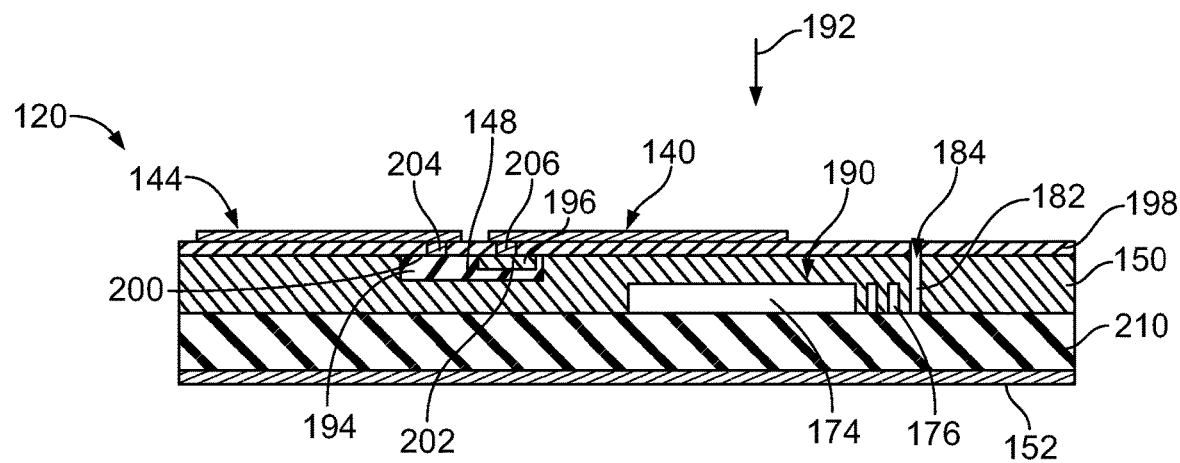
FIG. 4 illustrates a cross-sectional view of the pressure sensor assembly through line 4-4 of FIG. 2.

FIG. 4 illustrates a cross-sectional view of the pressure sensor assembly 120 through line 4-4 of FIG. 2. Referring to FIGS. 1-4, the substrate 150 includes a diaphragm 190 positioned over the cavity 174. The diaphragm 190 is between the cavity 174 and the first receive antenna array 140 (and/or the second receive antenna array 142). The first receive antenna array 140 and the second receive antenna array 142 each have an electrical resonant frequency determined primarily by the capacitance between the first receive antenna array 140 (and/or the second receive antenna array 142) and the backside ground plane 152. The electrical resonant frequency of the first receive antenna array 140 (and/or the second receive antenna array 142) changes as a function of displacement of the diaphragm 190 above the cavity 174 moving back and forth due to an external sound pressure level 192. The change in the electrical resonant frequency of the first receive antenna array 140 (and/or the second receive antenna array 142) changes the frequency of the third signal 132, as generated by the diode 148, and transmitted by the transmit receive antenna array 144. The third signal 132 is received by the receive antenna array 110 of the transceiver assembly 102, and the receiver 114 is configured to determine the external sound pressure level 192 in response to the third signal 132, as a function of variation of the third signal 132. For example, the third signal 132 at the third frequency varies in response when there is no external sound pressure, while the third signal 132 at the third frequency varies in response to the sound pressure level 192. The third signal 132 having the variation is correlated with and/or differentiated from the third signal 132 with no variation.

In at least one embodiment, in order to form the pressure sensor assembly 120, the substrate 150 may be provided as a P-type doped semiconductor substrate. The diode 148 is formed on and/or within the substrate 150 by doping with an N-type impurity 194 (for example, a first N-type impurity). Then, an N+-type impurity 196 (for example, a second N-type impurity) is doped on the N-type impurity 194. An oxidation layer 198 may then be deposited over the substrate 150 having a first channel 200 over the N-type impurity 194 and a second channel 202 over the N+ type impurity 196. The N-type impurity 194 and the N+-type impurity define junctions of the diode 148. The oxidation layer 198 provides electrical insulation for electrical pads.

Next, metal is deposited over the oxidation layer 198 to form the first receive antenna array 140, the second receive antenna array 142, the first microstrip feed 146, the second microstrip feed 147, the transmit antenna array 144, and electrical contacts 204 and 206 within the first channel 200 and the second channel 202, respectively. Next, the cavity 174, the vent channel 176, and the vent outlet 182 are formed through the substrate opposite from the oxidation layer 198, such as via laser etching, milling, cutting, or the like. Subsequently, a metal layer is deposited on a second substrate 210 to form the backside ground plane 152. The second substrate 210 is then bonded to the first substrate 150.

The pressure sensor assembly 120 shown and described with respect to FIGS. 1-4 includes the first receive antenna array 140, the second receive antenna array 142, and the transmit antenna array 144. The cavity 174 may be disposed underneath one or both of the first receive antenna array 140 and/or the second receive antenna array 142, thereby forming the diaphragm 190, which moves in response to acoustic pressure. The diode 148 is formed on and/or within the substrate 150 and connects the first receive antenna array 140 and the second receive antenna array 142 to the transmit antenna array 144. The first receive antenna array 140, the second receive antenna array 142, and the transmit antenna array 144 are edge fed over the substrate 150. The diode 148 may be formed within the substrate 150, while the first receive antenna array 140, the second receive antenna array 142, and the transmit antenna array 144 are disposed above the substrate 150.

In at least one embodiment, the first receive antenna array 140, the second receive antenna array 142, and the transmit antenna array 144 are edge-fed with respect to the diode 148. Further, in at least one embodiment, the diode 148 is a Schottky diode. In at least one other embodiment, the diode 148 is a p-n junction diode.

In at least one embodiment, the first receive antenna array 140, the second receive antenna array 142, and the transmit antenna array 144 are proximity coupled to the diode 148. Further, in at least one embodiment, the diode 148 is a Schottky diode. In at least one other embodiment, the diode 148 is a p-n junction diode.

Figure 5:
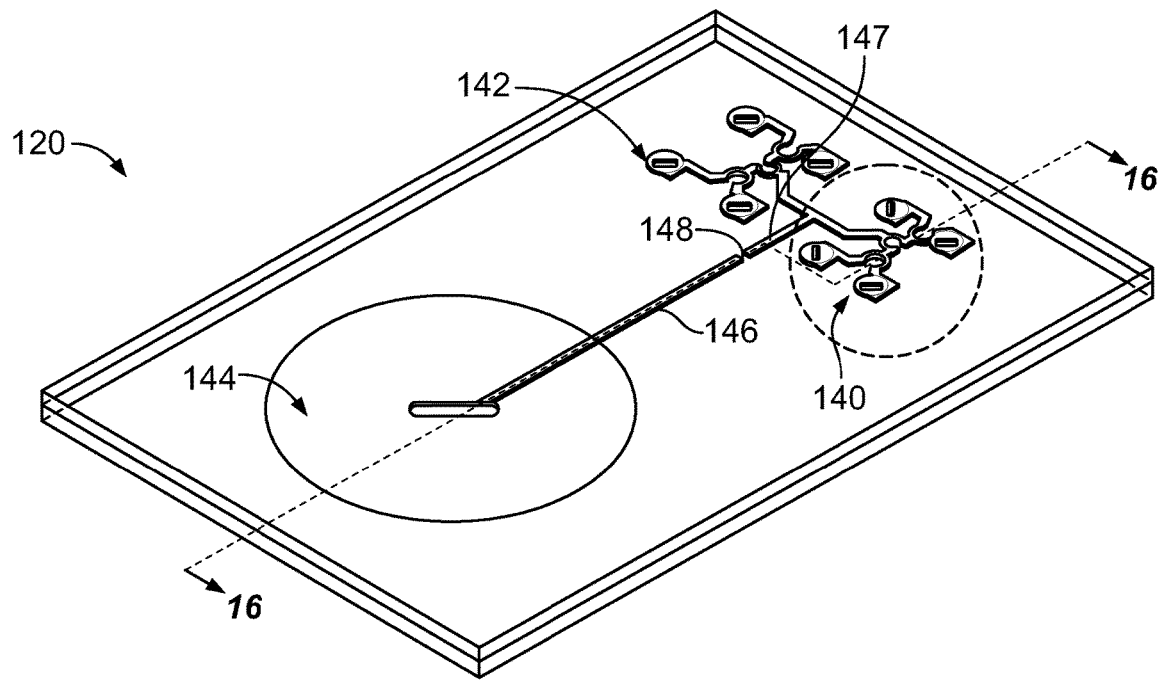
FIG. 5 illustrates a perspective top view of a pressure sensor assembly, according to an embodiment of the present disclosure.

FIG. 5 illustrates a perspective top view of the pressure sensor assembly 120, according to an embodiment of the present disclosure. As shown, the transmit antenna array 144 may have a circular shape. Optionally, the transmit antenna array 144 may be shaped differently, such as rectangular.

Figure 6:
FIG. 6 illustrates a cross-sectional view of a first substrate, according to an embodiment of the present disclosure.

FIG. 6 illustrates a cross-sectional view of a first substrate 300, according to an embodiment of the present disclosure. In order to form the pressure sensor assembly 120 shown in FIG. 5, the first substrate 300 is first provided. The first substrate 300 may be an intrinsic semiconducting substrate.

Figure 7:
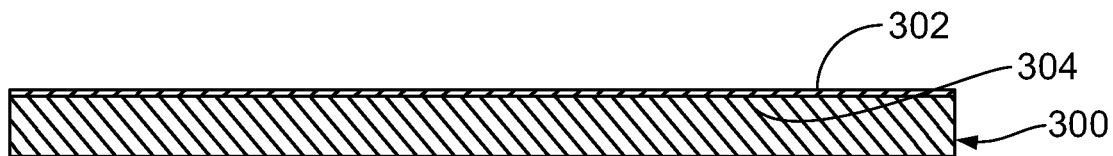
FIG. 7 illustrates a cross-sectional view of the first substrate doped with a P-type impurity, according to an embodiment of the present disclosure.

FIG. 7 illustrates a cross-sectional view of the first substrate 300 doped with a P-type impurity 302 (for example, a first P-type impurity), according to an embodiment of the present disclosure. The P-type impurity 302 may be disposed over an entire upper surface 304 of the first substrate 300.

Figure 8:
FIG. 8 illustrates a cross-sectional view of an N-type impurity doped over the P-type impurity on the first substrate, according to an embodiment of the present disclosure.

FIG. 8 illustrates a cross-sectional view of an N-type impurity 306 (for example, a first N-type impurity) doped over a portion of the P-type impurity 302 on the first substrate 300, according to an embodiment of the present disclosure. The N-type impurity 306 is disposed over a portion of an upper surface 308 of the P-type impurity 302.

Figure 9:
FIG. 9 illustrates a cross-sectional view of a P-type impurity doped over the N-type impurity that is doped over the P-type impurity on the first substrate, according to an embodiment of the present disclosure.

FIG. 9 illustrates a cross-sectional view of a P-type impurity 310 (for example, a second P-type impurity) doped over a portion of the N-type impurity 306 that is doped over the P-type impurity 302 on the first substrate 300, according to an embodiment of the present disclosure. The first substrate 300 is doped with the P-type impurity 302, the N-type impurity 306, and the P-type impurity 310 to define junctions of the diode 148, which may be a p-n junction diode.

Figure 10:
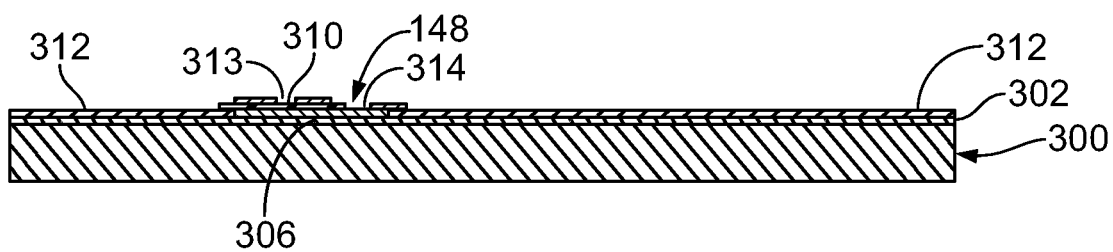
FIG. 10 illustrates a cross-sectional view of a passivation layer deposited over the first substrate, according to an embodiment of the present disclosure.

FIG. 10 illustrates a cross-sectional view of a passivation layer 312 deposited over the first substrate 300, according to an embodiment of the present disclosure. In particular, the passivation layer 312 is deposited over the P-type impurity 302, the N-type impurity 306, the P-type impurity 310 such that channels 313 and 314 are formed for the diode 148.

Figure 11:
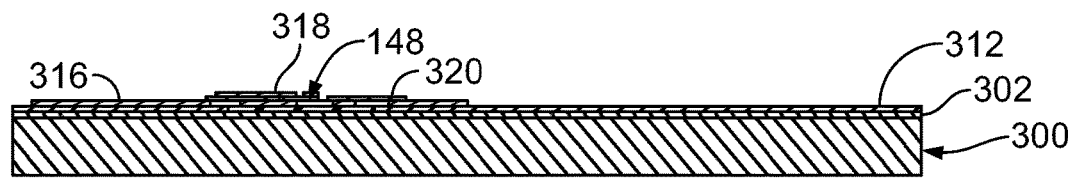
FIG. 11 illustrates a cross-sectional view of a first metal layer that forms electronic contacts deposited over the passivation layer, according to an embodiment of the present disclosure.

FIG. 11 illustrates a cross-sectional view of a first metal layer 316 that forms electronic contacts 318 and 320 deposited over the passivation layer 312, according to an embodiment of the present disclosure. The passivation layer 312 provides electrode pads for junctions of diode 148.

Figure 12:
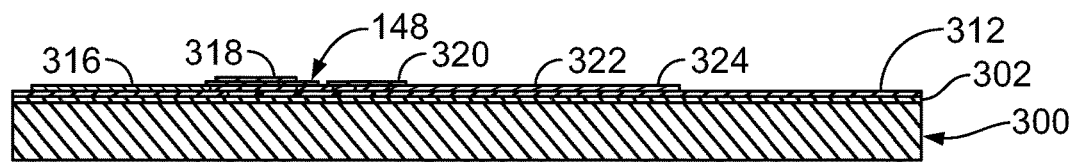
FIG. 12 illustrates a cross-sectional view of a second metal layer that forms a microstrip feed network deposited over the first metal layer, according to an embodiment of the present disclosure.

FIG. 12 illustrates a cross-sectional view of a second metal layer 322 that forms a microstrip feed network 324 deposited over the first metal layer 316, according to an embodiment of the present disclosure.

Figure 13:
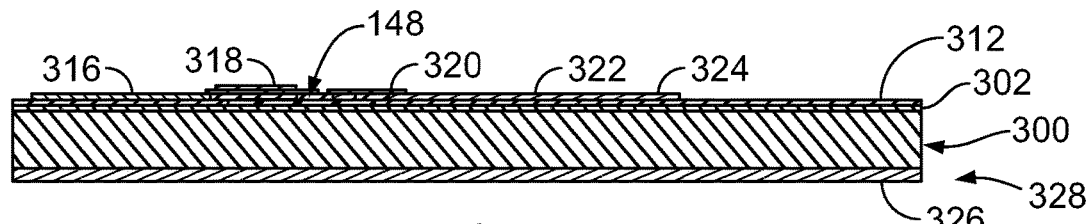
FIG. 13 illustrates a cross-sectional view of a third metal layer that forms a backside ground plane deposited on the first substrate opposite from the second metal layer, according to an embodiment of the present disclosure.

FIG. 13 illustrates a cross-sectional view of a third metal layer 326 that forms a backside ground plane 328, such as a backside ground plane, deposited on the first substrate 300 opposite from the second metal layer 322, according to an embodiment of the present disclosure.

Figure 14:
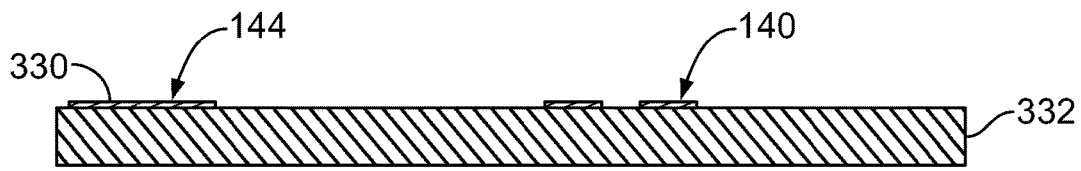
FIG. 14 illustrates a cross-sectional view of a fourth metal layer that forms the antenna arrays deposited on a second substrate, according to an embodiment of the present disclosure.
Figure 15:
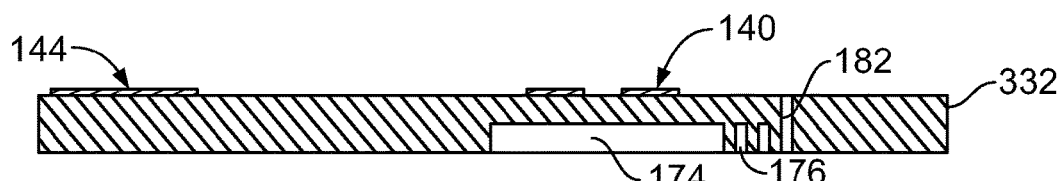
FIG. 15 illustrates a cross-sectional view of a cavity, vent channel, and vent outlet formed in the second substrate, according to an embodiment of the present disclosure.
Figure 16:
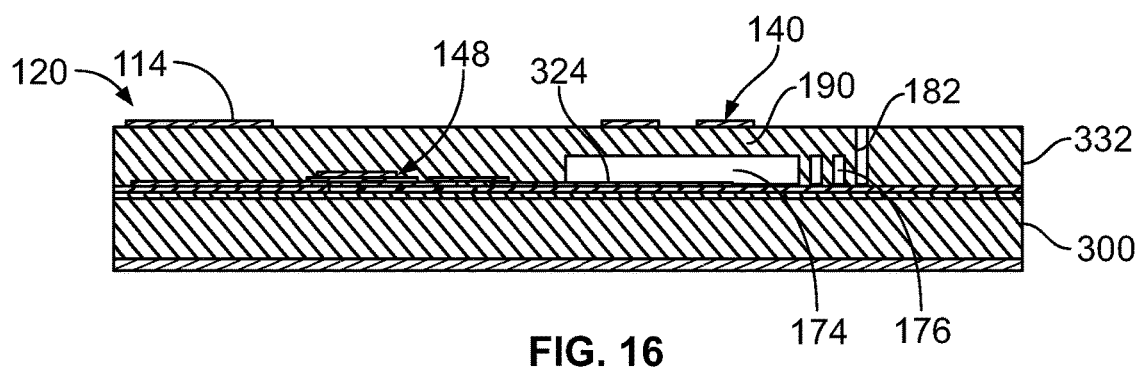
FIG. 16 illustrates a cross-sectional view of the first substrate bonded to the second substrate to form the pressure sensor assembly shown through line 16-16 of FIG. 5, according to an embodiment of the present disclosure.

FIG. 14 illustrates a cross-sectional view of a fourth metal layer 330 that forms the antenna arrays (such as the transmit antenna array 144 and the first receive antenna array 140) deposited on a second substrate 332, according to an embodiment of the present disclosure. FIG. 15 illustrates a cross-sectional view of the cavity 174, vent channel 176, and vent outlet 182 formed (such as via laser etching) in the second substrate 332, according to an embodiment of the present disclosure. FIG. 16 illustrates a cross-sectional view of the first substrate 300 bonded to the second substrate 332 to form the pressure sensor assembly 120 shown through line 16-16 of FIG. 5, according to an embodiment of the present disclosure.

Referring to FIGS. 5-16, the pressure sensor assembly 120 includes the transmit antenna array 144, the first receive antenna array 140, and the second receive antenna array 142 disposed on the second (or optionally, first) substrate 332, an electronics layer including the microstrip feed network 324, and the diode 148 underneath the second substrate 332, and disposed on the first (or optionally, second) substrate 300.

Accordingly, the transmit antenna array 144, the first receive antenna array 140, and the second receive antenna array 142 are electrically connected together by the microstrip feed network 324 which is underneath the top surface of the pressure sensor assembly 120. The microstrip feed network 324 and the diode 148 are electrically connected and may be embedded within the pressure sensor assembly 120, such as between the first substrate 300 and the second substrate 332.

Figure 17:
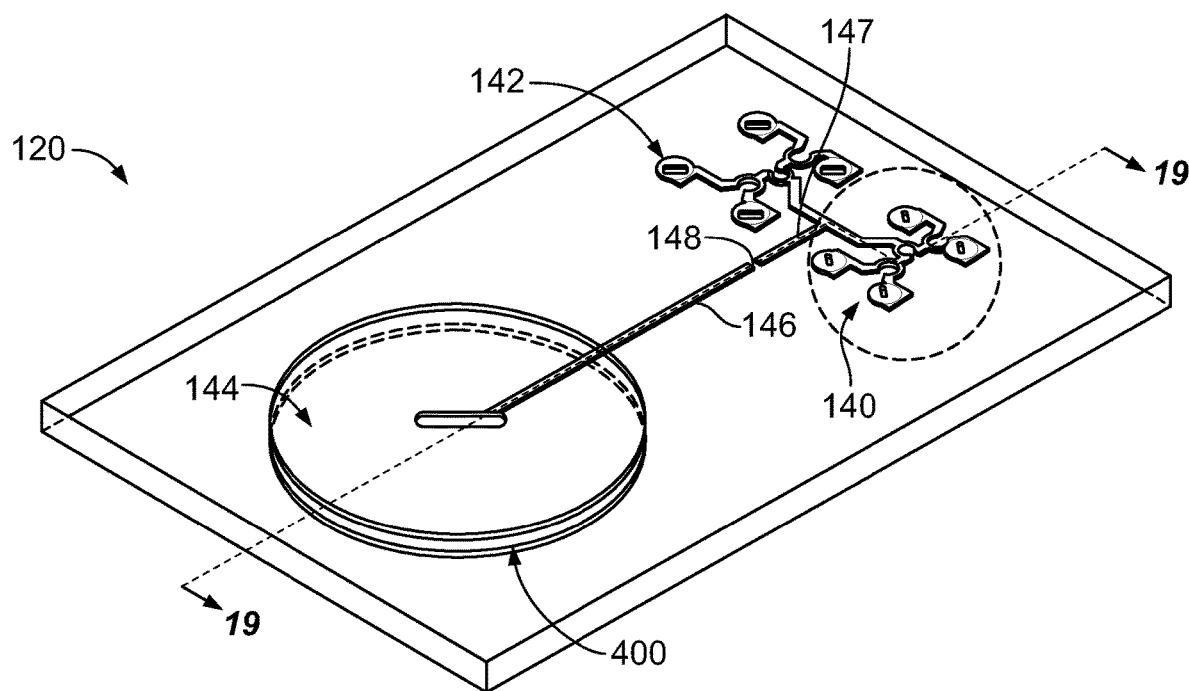
FIG. 17 illustrates a perspective top view of a pressure sensor assembly, according to an embodiment of the present disclosure.

FIG. 17 illustrates a perspective top view of the pressure sensor assembly 120, according to an embodiment of the present disclosure. The pressure sensor assembly 120 shown in FIG. 17 is similar to the pressure sensor assembly 120 shown in FIG. 5, except that a cavity 400, which enhances bandwidth, is formed underneath at least a portion of the transmit antenna array 144. A cavity may also be formed underneath at least a portion of one or both of the first receive antenna array 140 and/or the second receive antenna array 142. The cavity 400 may be formed underneath the transmit antenna array 144 in the substrate 300 or the substrate 332, shown in FIG. 16.

Figure 18:
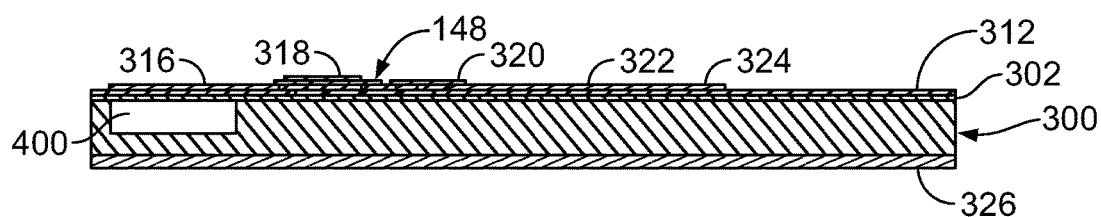
FIG. 18 illustrates a cross-sectional view of a cavity formed in the first substrate, according to an embodiment of the present disclosure.

FIG. 18 illustrates a cross-sectional view of the cavity 400 formed in the first substrate 300, according to an embodiment of the present disclosure. Referring to FIGS. 17-18, the pressure sensor assembly 120 is initially formed as described with respect to FIGS. 6-13. Then, the cavity 400 is formed in the first substrate 300, such as through laser etching. Next, the first receive antenna array 140, the second receive antenna array 142, the transmit antenna array 144, the cavity 174, the vent channel 176, and the vent outlet 182 are formed in relation to the second substrate 332 as shown and described with respect to FIGS. 14 and 15.

Figure 19:
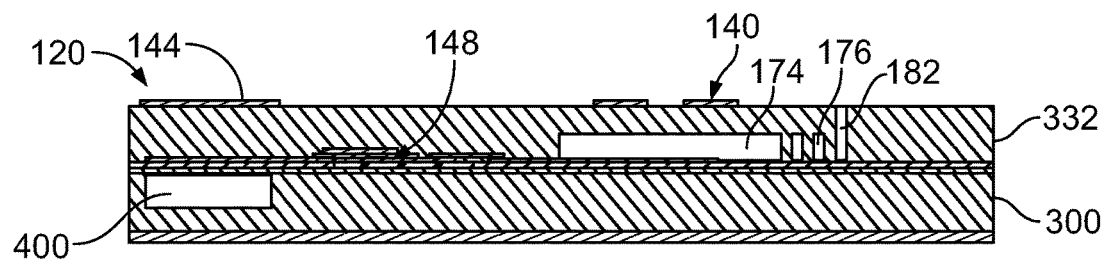
FIG. 19 illustrates a cross-sectional view of a first substrate bonded to a second substrate to form the pressure sensor assembly shown through line 19-19 of FIG. 17, according to an embodiment of the present disclosure.

FIG. 19 illustrates a cross-sectional view of the first substrate 300 bonded to the second substrate 332 to form the pressure sensor assembly 120 shown through line 19-19 of FIG. 17. It has been found that the cavity 400 underneath the transmit antenna array 144 increases gain and bandwidth of the transmit antenna array 144. The cavity 400 may be formed within the substrate 300, as shown, or the substrate 332. Any of the embodiments of the present disclosure may include the cavity 400 underneath the transmit antenna array 144.

Figure 20:
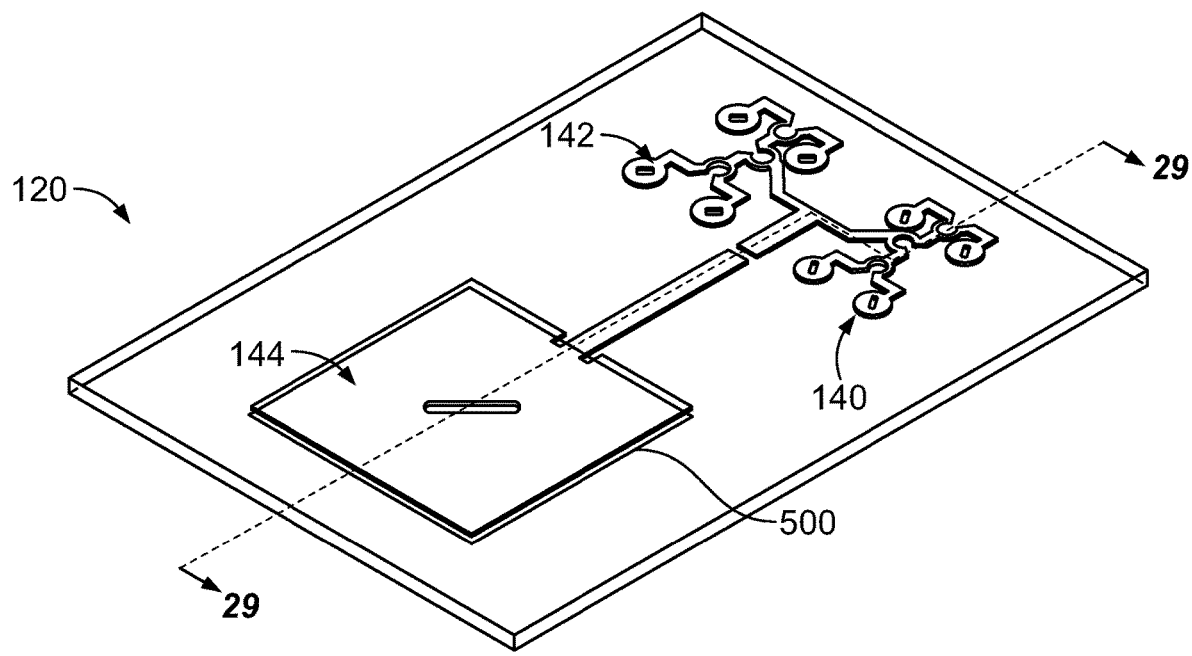
FIG. 20 illustrates a perspective top view of a pressure sensor assembly, according to an embodiment of the present disclosure.

FIG. 20 illustrates a perspective top view of the pressure sensor assembly 120, according to an embodiment of the present disclosure. The pressure sensor assembly 120 shown and described with respect to FIG. 20 is similar to the pressure sensor assembly 120 shown and described with respect to FIGS. 2-4, except that a cavity 500 is formed underneath at least a portion of the transmit antenna array 144. A cavity may also be formed underneath at least a portion of one or both of the first receive antenna array 140 and/or the second receive antenna array 142.

Figure 21:
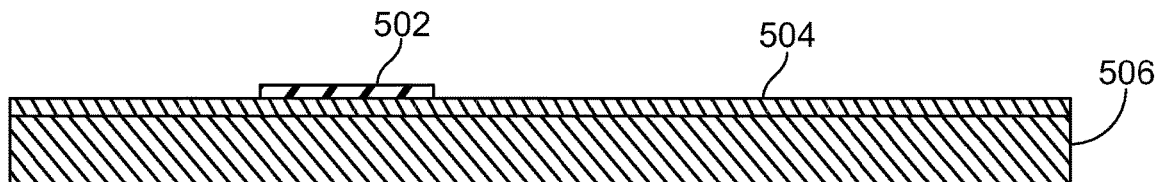
FIG. 21 illustrates a cross-sectional view of an N-type impurity doped on a P-type impurity doped on a first substrate, according to an embodiment of the present disclosure.
Figure 22:
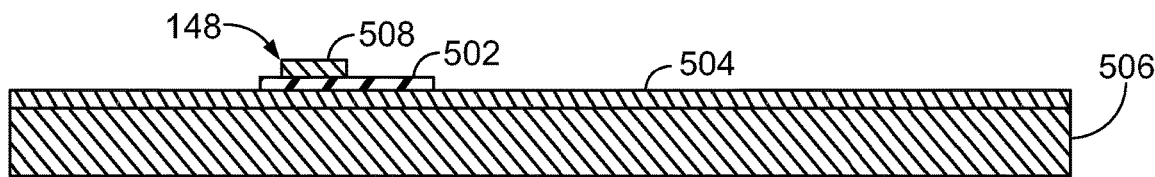
FIG. 22 illustrates a cross-sectional view of a P-type impurity doped on the N-type impurity that is doped on the P-type impurity that is doped on the first substrate, according to an embodiment of the present disclosure.
Figure 23:
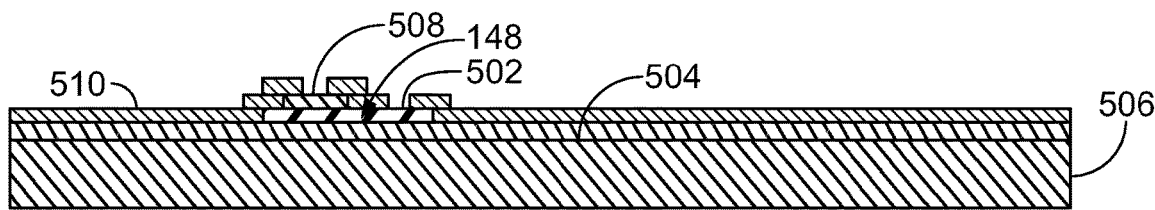
FIG. 23 illustrates a cross-sectional view of a passivation layer deposited over the first substrate, according to an embodiment of the present disclosure.
Figure 24:
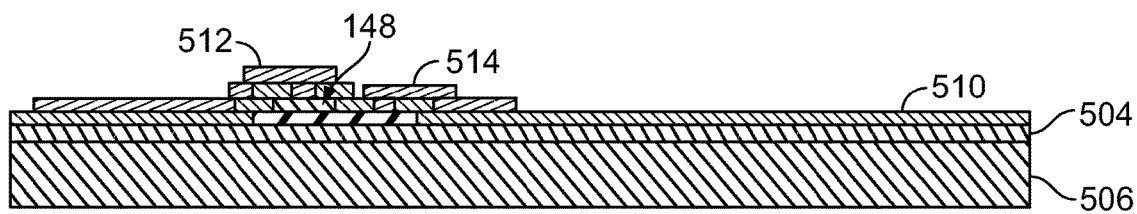
FIG. 24 illustrates a cross-sectional view of a first metal layer deposited over the passivation layer to form electronics contacts, according to an embodiment of the present disclosure.
Figure 25:
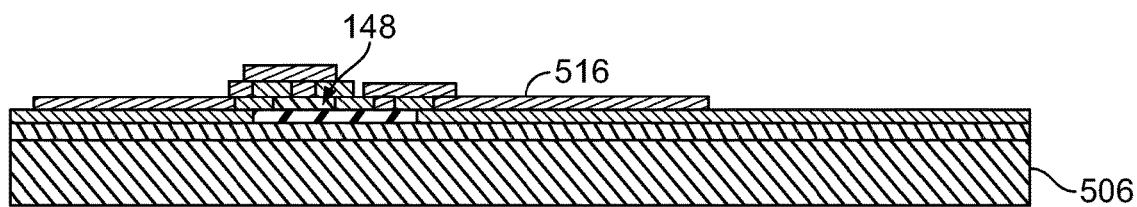
FIG. 25 illustrates a cross-sectional view of a second metal layer deposited over the first substrate to form antenna arrays, according to an embodiment of the present disclosure.
Figure 26:
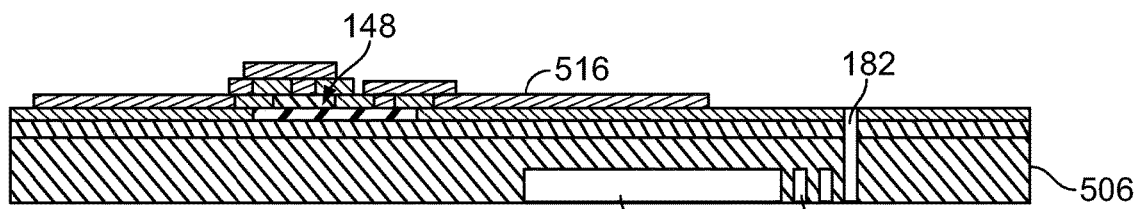
FIG. 26 illustrates a cross-sectional view of a first cavity, vent channel, and vent outlet formed in the first substrate, according to an embodiment of the present disclosure.
Figure 27:
FIG. 27 illustrates a cross-sectional view of a third metal layer deposited on a second substrate to form a backside ground plane, according to an embodiment of the present disclosure.
Figure 28:
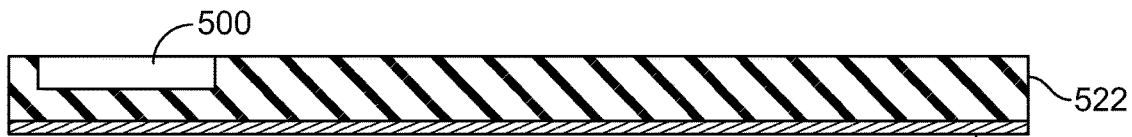
FIG. 28 illustrates a cross-sectional view of a second cavity formed in the second substrate, according to an embodiment of the present disclosure.
Figure 29:
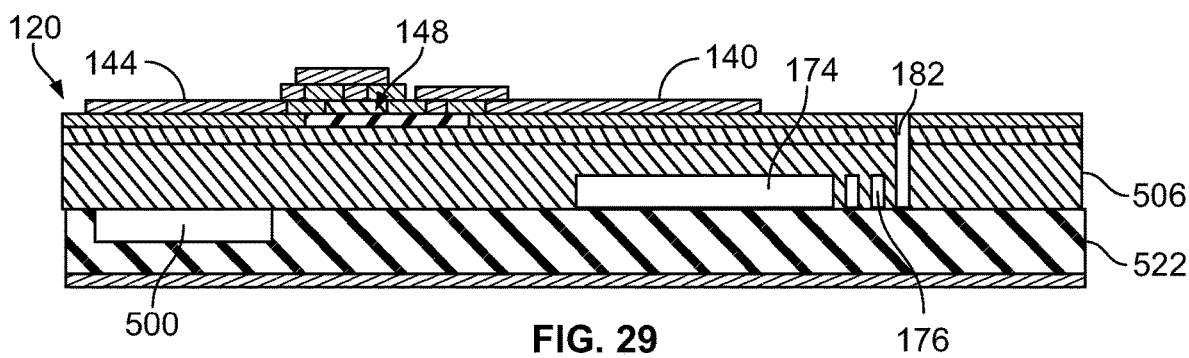
FIG. 29 illustrates a cross-sectional view of the first substrate bonded to the second substrate to form the pressure sensor assembly shown through line 29-29 of FIG. 20, according to an embodiment of the present disclosure.

In order to form the pressure sensor assembly 120, an N-type impurity 502 is doped on a P-type impurity 504 that is doped on a first substrate 506, as shown in FIG. 21. Next, as shown in FIG. 22, a P-type impurity 508 is doped on the N-type impurity 502 that is doped on the P-type impurity 504 that is doped on the first substrate 506 to form the junctions of the diode 148, such as a p-n junction diode. Next, as shown in FIG. 23, a passivation layer 510 is deposited over the first substrate 506. As shown in FIG. 24, a first metal layer 512 is then deposited over the passivation layer 510 to form electronics contacts 514. Then, as shown in FIG. 25, a second metal layer 516 is deposited over the first substrate 506 to form antenna arrays (such as the arrays 140, 142, and 144 shown in FIG. 20). Next, the first cavity 174, the vent channel 176, and the vent outlet 182 formed in the first substrate 506, such as through laser etching. Next, as shown in FIG. 27, a third metal layer 520 deposited on a second substrate 522 to form a backside ground plane. As shown in FIG. 28, the cavity 500 (for example, a second cavity), which enhances bandwidth, is formed in the second substrate 522, such as via laser etching. As shown in FIG. 29, the first substrate 506 is bonded to the second substrate 522 to form the pressure sensor assembly 120 shown through line 29-29 of FIG. 20. The first receive antenna array 140, the second receive antenna array 142, and the transmit antenna array 144 may be edge feed antenna arrays. It has been found that the cavity 500 underneath the transmit antenna array 144 increases gain and bandwidth of the transmit antenna array 144. The cavity 500 may be formed within the first substrate 506, as shown, or the second substrate 522 (or any of the substrates described herein). Any of the embodiments of the present disclosure may include the cavity 500 underneath the transmit antenna array 144.

Figure 30A:
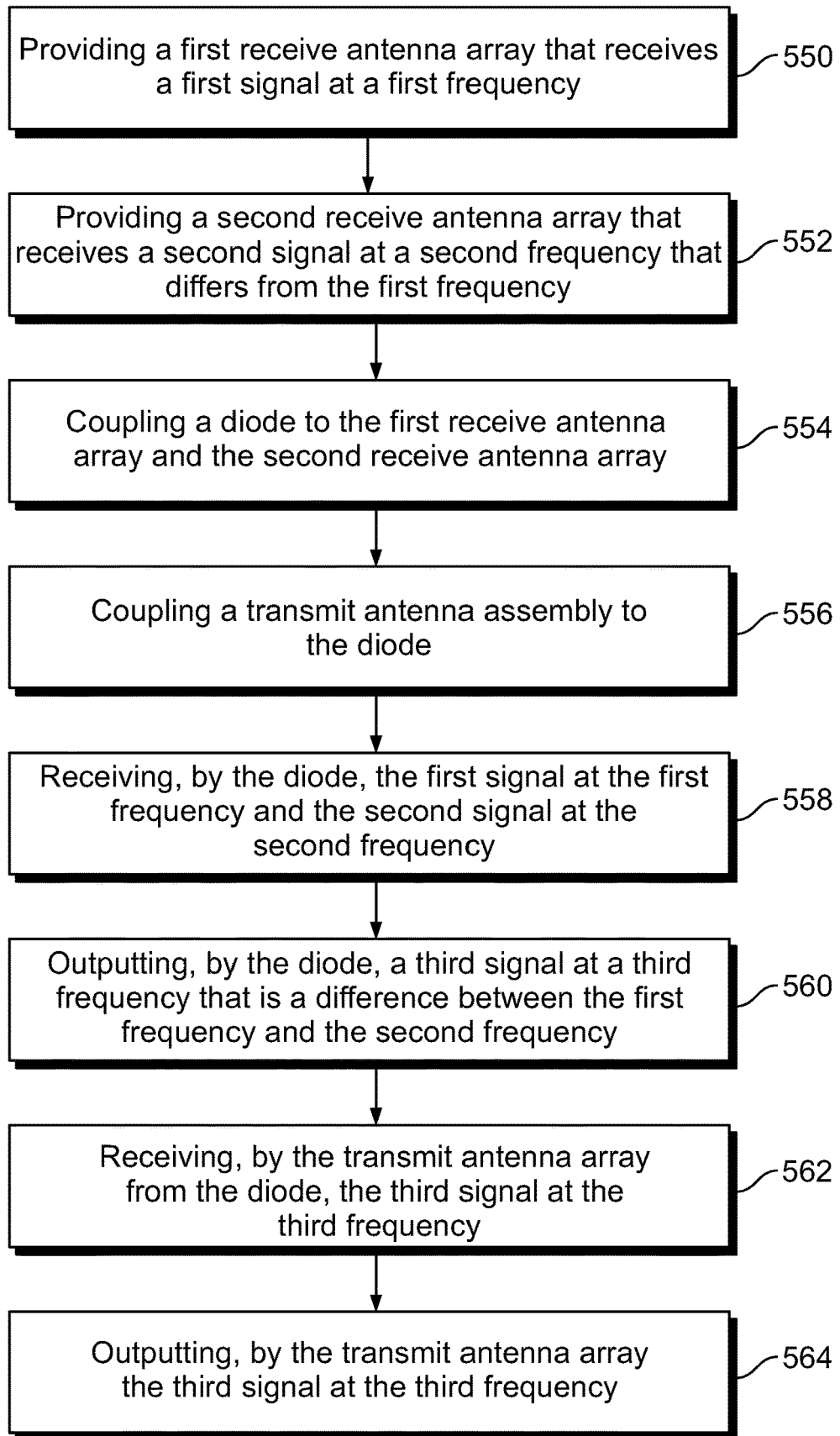
FIG. 30A illustrates a flow chart of a pressure sensing method, according to an embodiment of the present disclosure.

FIG. 30A illustrates a flow chart of a pressure sensing method, according to an embodiment of the present disclosure. The pressure sensing method includes providing (550) a first receive antenna array that receives a first signal at a first frequency, providing (552) a second receive antenna array that receives a second signal at a second frequency that differs from the first frequency, coupling (for example, electrically connecting) (554) a diode to the first receive antenna array and the second receive antenna array, coupling (for example, electrically connecting) (556) a transmit antenna array to the diode, receiving (558), by the diode, the first signal at the first frequency and the second signal at the second frequency, outputting (560), by the diode, a third signal at a third frequency that is a difference between the first frequency and the second frequency, receiving (562), by the transmit antenna array from the diode, the third signal at the third frequency, and outputting (564), by the transmit antenna array, the third signal at the third frequency. In at least one embodiment, the outputting (564), by the transmit antenna array, includes outputting the third signal at the third frequency to a receiver, and wherein the pressure sensing method further includes determining, by the receiver, a pressure level from the third signal at the third frequency.

Figure 30B:
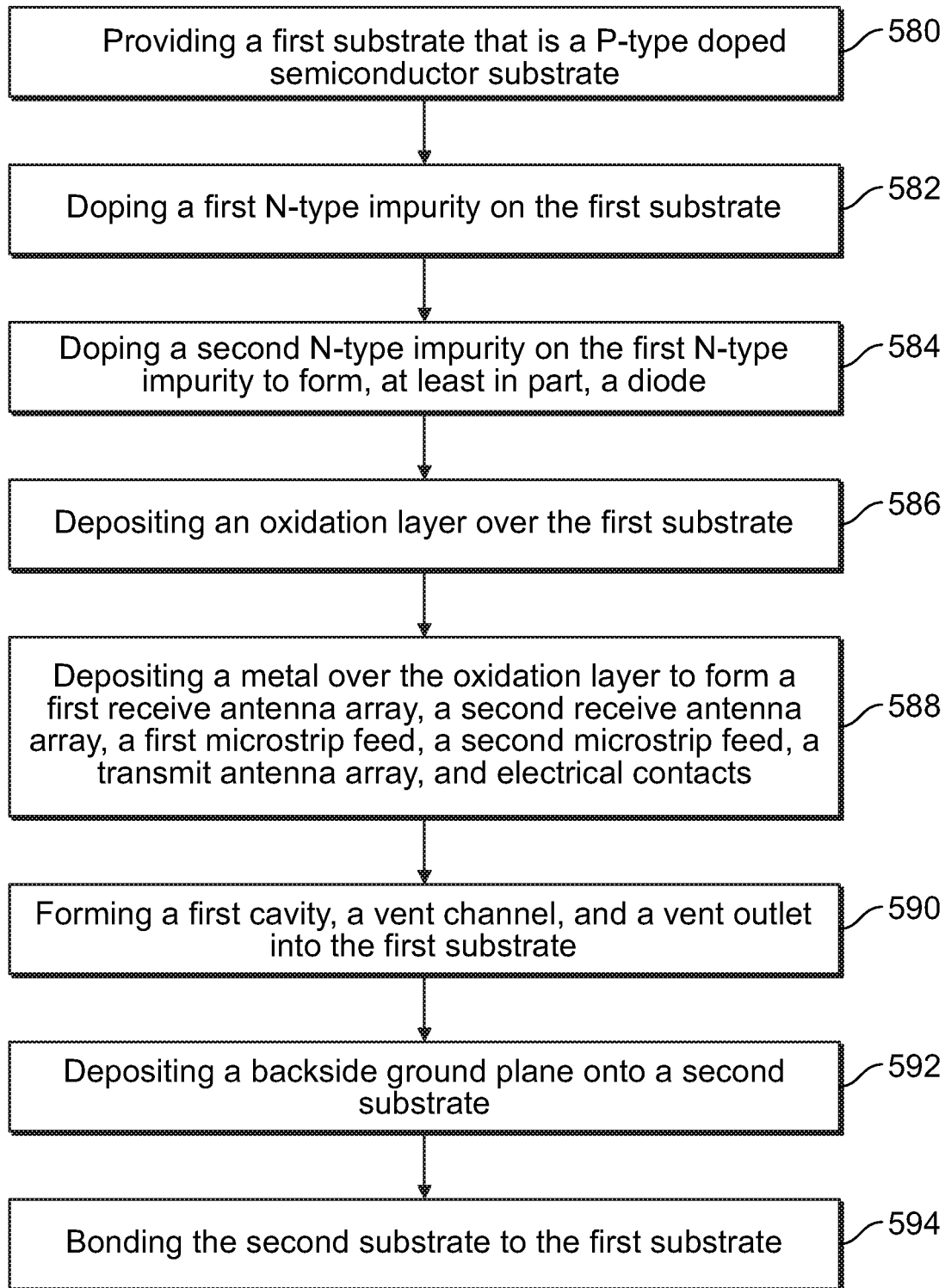
FIG. 30B illustrates a flow chart of a method of forming a pressure sensor assembly, according to an embodiment of the present disclosure.

FIG. 30B illustrates a flow chart of a method of forming a pressure sensor assembly, according to an embodiment of the present disclosure. In at least one embodiment, the method of forming includes providing (580) a first substrate that is a P-type doped semiconductor substrate, doping (582) a first N-type impurity on the first substrate, doping (584) a second N-type impurity on the first N-type impurity to form, at least in part, a diode, depositing (586) an oxidation layer over the first substrate, depositing (588) a metal over the oxidation layer to form a first receive antenna array, a second receive antenna array, a first microstrip feed, a second microstrip feed, a transmit antenna array, and electrical contacts, forming (590) (such as through laser etching) a first cavity, a vent channel, and a vent outlet into the first substrate, depositing (592) a backside ground plane onto a second substrate, and bonding (594) the second substrate to the first substrate. It is to be understood that the method shown in FIG. 30B is merely exemplary. The method of forming the pressure sensor assembly may include more or less steps than shown.

Figure 30C:
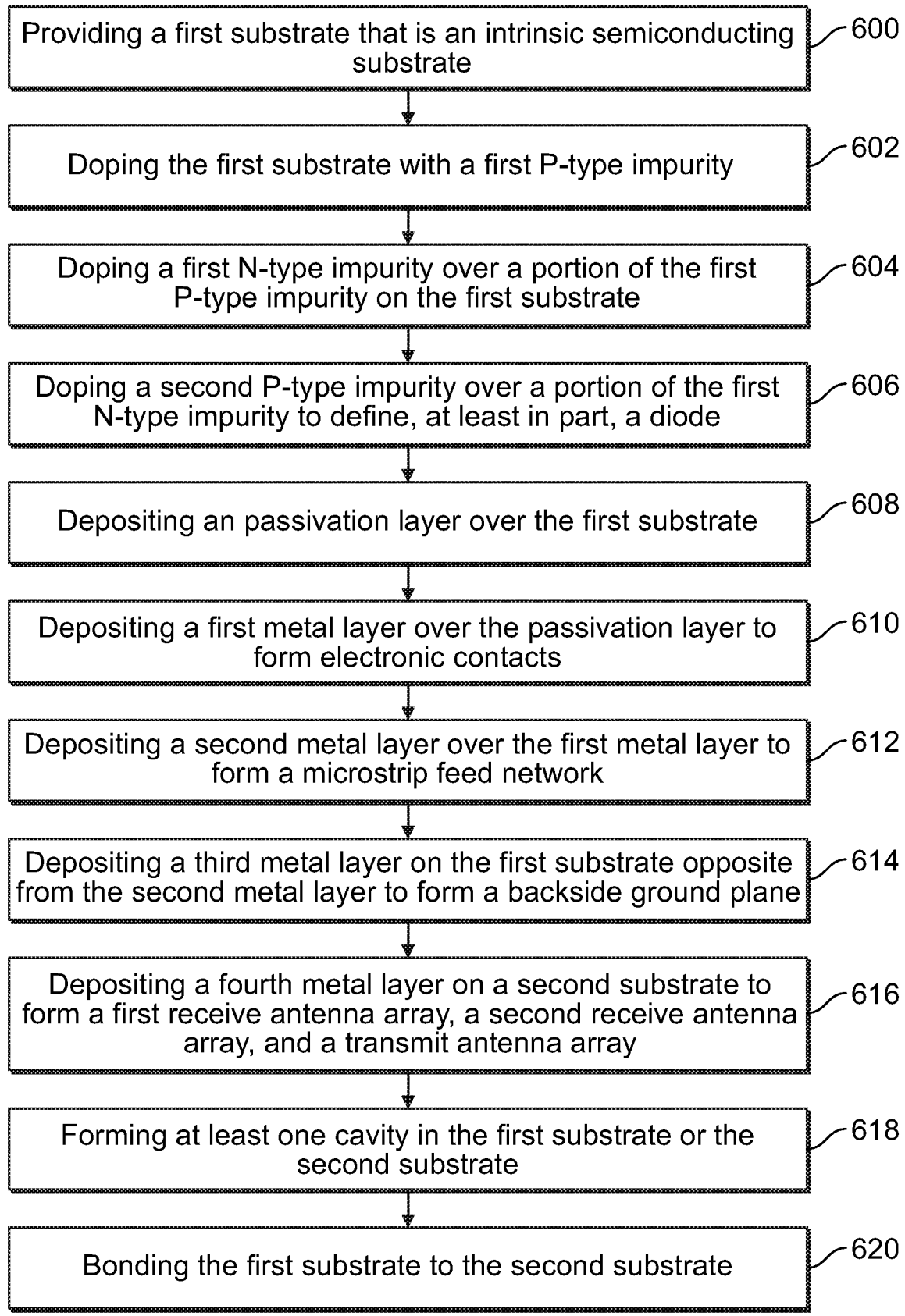
FIG. 30C illustrates a flow chart of a method of forming a pressure sensor assembly, according to an embodiment of the present disclosure.

FIG. 30C illustrates a flow chart of a method of forming a pressure sensor assembly, according to an embodiment of the present disclosure. In at least one embodiment, the method includes providing (600) a first substrate that is an intrinsic semiconducting substrate, doping (602) the first substrate with a first P-type impurity, doping (604) a first N-type impurity over a portion of the first P-type impurity on the first substrate, doping (606) a second P-type impurity over a portion of the first N-type impurity to define, at least in part, a diode, depositing (608) a passivation layer over the first substrate, depositing (610) a first metal layer over the passivation layer to form electronic contacts, depositing (612) a second metal layer over the first metal layer to form a microstrip feed network, depositing (614) a third metal layer on the first substrate opposite from the second metal layer to form a backside ground plane, depositing (616) a fourth metal layer on a second substrate to form a first receive antenna array, a second receive antenna array, and a transmit antenna array, forming (618) at least one cavity in the first substrate or the second substrate, and bonding (620) the first substrate to the second substrate. It is to be understood that the method shown in FIG. 30C is merely exemplary. The method of forming the pressure sensor assembly may include more or less steps than shown.

Figure 31:
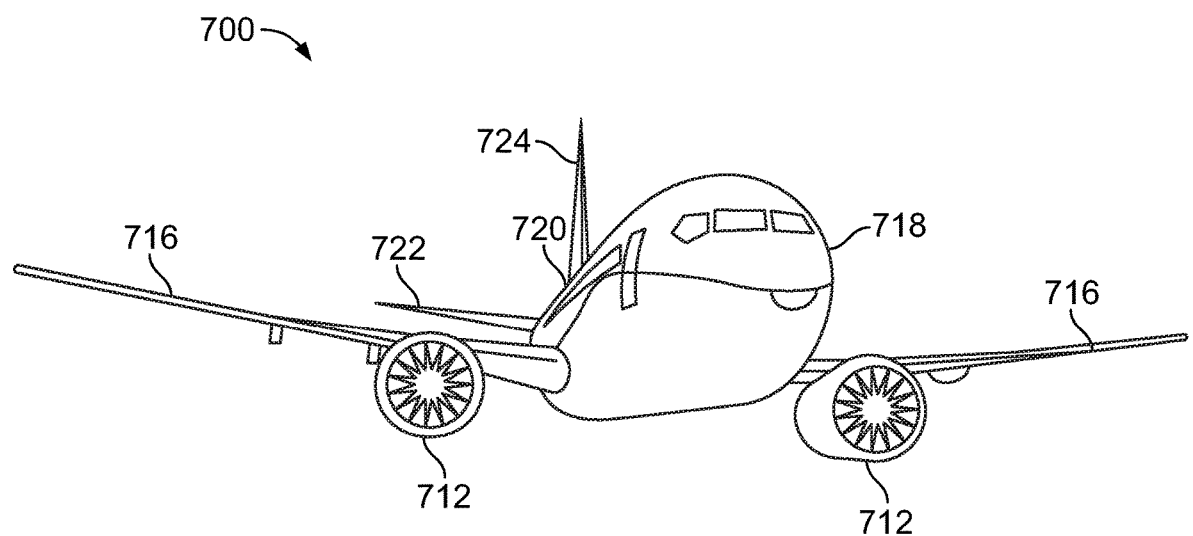
FIG. 31 illustrates a perspective front view of an aircraft.

FIG. 31 illustrates a perspective front view of an aircraft 700. Embodiments of the present disclosure may be used to detect noise is sound pressure levels generated by portion of the aircraft 700. For example, any of the pressure sensor assemblies 120 described herein may be used to detect noise is sound pressure levels generated by engines of the aircraft 700.

The aircraft 700 may include a propulsion system that may include two engines 712, for example. Optionally, the propulsion system may include more engines 712 than shown. The engines 712 are carried by wings 716 of the aircraft 700. In other embodiments, the engines 712 may be carried by a fuselage 718 and/or an empennage 720. The empennage 720 may also support horizontal stabilizers 722 and a vertical stabilizer 724. The wings 716, the horizontal stabilizers 722, and the vertical stabilizer 724 may each include one or more control surfaces.

Optionally, embodiments of the present disclosure may be used with respect to various other structures, such as other vehicles (including automobiles, watercraft, spacecraft, and the like), buildings, appliances, and the like.

As described herein, embodiments of the present disclosure provide efficient systems and methods for detecting pressure, such as within an engine of an aircraft. Further, embodiments of the present disclosure provide compact and cost-effective pressure sensor assemblies.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope.

While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A pressure sensor assembly, comprising:
   a first receive antenna array configured to receive a first signal at a first frequency;
   a second receive antenna array configured to receive a second signal at a second frequency that differs from the first frequency;
   a diode coupled to both the first receive antenna array and the second receive antenna array, wherein the diode is configured to receive the first signal at the first frequency and the second signal at the second frequency and output a third signal at a third frequency that is a difference between the first frequency and the second frequency; and
   a transmit antenna array coupled to the diode, wherein the transmit antenna array is configured to receive the third signal at the third frequency and output the third signal at the third frequency.

2. The pressure sensor assembly of claim 1, further comprising a first substrate, wherein the first receive antenna array, the second receive antenna array, and the transmit antenna array are disposed on the first substrate.

3. The pressure sensor assembly of claim 1, further comprising:
   a first microstrip feed that connects the transmit antenna array to the diode; and
   a second microstrip feed that connects the first receive antenna array and the second receive antenna array to the diode.

4. The pressure sensor assembly of claim 1, wherein the first receive antenna array and the second receive antenna array operate in a W-band, and wherein the transmit antenna array operates in an X-band.

5. The pressure sensor assembly of claim 1, wherein the diode is one of a p-n junction diode, a PIN diode, a Schottky diode, a Zener diode, or a tunnel diode.

6. The pressure sensor assembly of claim 5, wherein one or more of the first receive antenna array, the second receive antenna array, or the transmit antenna array are edge-fed in relation to the diode.

7. The pressure sensor assembly of claim 5, wherein one or more of the first receive antenna array, the second receive antenna array, or the transmit antenna array are proximity-coupled in relation to the diode.

8. The pressure sensor assembly of claim 1, further comprising at least one cavity disposed within at least one substrate underneath at least a portion of one or more of the first receive antenna array, the second receive antenna array, or the transmit antenna array.

9. The pressure sensor assembly of claim 8, wherein the at least one cavity comprises a first cavity within the at least one substrate underneath at least a portion of one or both of the first receive antenna array or the second receive antenna array.

10. The pressure sensor assembly of claim 9, further comprising:
a vent channel formed through and extending within the at least one substrate, wherein the vent channel is fluidly connected to the first cavity; and
a vent outlet formed within the at least one substrate, wherein the vent outlet is fluidly connected to the vent channel.

11. The pressure sensor assembly of claim 8, wherein the at least one cavity comprises a first cavity within the at least one substrate underneath at least a portion of the transmit antenna array.

12. The pressure sensor assembly of claim 8, wherein the at least one cavity comprises:
a first cavity within the at least one substrate underneath at a least a portion of one or both of the first receive antenna array or the second receive antenna array; and
a second cavity within the at least one substrate underneath at least a portion of the transmit antenna array.

13. The pressure sensor assembly of claim 8, further comprising at least one diaphragm positioned over the at least one cavity.

14. The pressure sensor assembly of claim 1, further comprising a first substrate that is a P-type doped semiconductor substrate.

15. The pressure sensor assembly of claim 14, wherein a first N-type impurity is doped on the first substrate.

16. The pressure sensor assembly of claim 15, wherein a second N-type impurity is doped on the first N-type impurity to form, at least in part, the diode.

17. The pressure sensor assembly of claim 16, further comprising an oxidation layer deposited over the first substrate.

18. The pressure sensor assembly of claim 17, wherein a metal is deposited over the oxidation layer to form the first receive antenna array, the second receive antenna array, a first microstrip feed, a second microstrip feed, the transmit antenna array, and electrical contacts.

19. The pressure sensor assembly of claim 18, further comprising a first cavity, a vent channel, and a vent outlet formed into the first substrate.

20. The pressure sensor assembly of claim 19, further comprising:
a second substrate; and
a backside ground plane deposited onto the second substrate, wherein the second substrate is bonded to the first substrate.

21. The pressure sensor assembly of claim 1, further comprising a first substrate that is an intrinsic semiconducting substrate.

22. The pressure sensor assembly of claim 21, wherein the first substrate is doped with a first P-type impurity.

23. The pressure sensor assembly of claim 22, wherein a first N-type impurity doped over a portion of the first P-type impurity on the first substrate.

24. The pressure sensor assembly of claim 23, wherein a second P-type impurity is doped over a portion of the first N-type impurity to define, at least in part, the diode.

25. The pressure sensor assembly of claim 24, further comprising a passivation layer deposited over the first substrate.

26. The pressure sensor assembly of claim 25, further comprising a first metal layer that forms electronic contacts deposited over the passivation layer.

27. The pressure sensor assembly of claim 26, further comprising a second metal layer that forms a microstrip feed network deposited over the first metal layer.

28. The pressure sensor assembly of claim 27, further comprising a third metal layer that forms a backside ground plane deposited on the first substrate opposite from the second metal layer.

29. The pressure sensor assembly of claim 28, wherein the pressure sensor assembly further comprises a fourth metal layer that forms the first receive antenna array, the second receive antenna array, and the transmit antenna array on a second substrate.

30. The pressure sensor assembly of claim 29, further comprising at least one cavity formed in the first substrate or the second substrate.

31. The pressure sensor assembly of claim 30, wherein the at least one cavity comprises:
a first cavity formed in the first substrate underneath at least a portion of the transmit antenna array; and
a second cavity formed in the second substrate underneath at least a portion of one or both of the first receive antenna array or the second receive antenna array.

32. The pressure sensor assembly of claim 30, wherein the first substrate is bonded to the second substrate.

33. A pressure sensor assembly, comprising:
at least one substrate;
a backside ground plane coupled to the at least one substrate;
a first receive antenna array disposed on the at least one substrate, wherein the first receive antenna array is configured to receive a first signal at a first frequency;
a second receive antenna array disposed on the at least one substrate, wherein the second receive antenna array is configured to receive a second signal at a second frequency that differs from the first frequency;
a diode disposed on or within the at least one substrate, wherein the diode is coupled to both the first receive antenna array and the second receive antenna array, wherein the diode is configured to receive the first signal at the first frequency and the second signal at the second frequency and output a third signal at a third frequency that is a difference between the first frequency and the second frequency;
a transmit antenna array disposed on the at least one substrate, wherein the transmit antenna array is coupled to the diode, wherein the transmit antenna array is configured to receive the third signal at the third frequency and output the third signal at the third frequency;
a first microstrip feed that connects the transmit antenna array to the diode;
a second microstrip feed that connects the first receive antenna array and the second receive antenna array to the diode; and
at least one cavity disposed within the at least one substrate underneath at least a portion of one or more of the first receive antenna array, the second receive antenna array, or the transmit antenna array.

34. The pressure sensor assembly of claim 33, wherein the first receive antenna array and the second receive antenna array operate in a W-band, and wherein the transmit antenna array operates in an X-band.

35. The pressure sensor assembly of claim 33, wherein the at least one cavity comprises a first cavity within the at least one substrate underneath at least a portion of one or both of the first receive antenna array or the second receive antenna array.

36. The pressure sensor assembly of claim 35, further comprising:
a vent channel formed through and extending within the at least one substrate, wherein the vent channel is fluidly connected to the first cavity; and
a vent outlet formed within the at least one substrate, wherein the vent outlet is fluidly connected to the vent channel.

37. The pressure sensor assembly of claim 33, wherein the at least one cavity comprises a first cavity within the at least one substrate underneath at least a portion of the transmit antenna array.

38. The pressure sensor assembly of claim 33, wherein the at least one cavity comprises:
a first cavity within the at least one substrate underneath at a least a portion of one or both of the first receive antenna array or the second receive antenna array; and
a second cavity within the at least one substrate underneath at least a portion of the transmit antenna array.

39. The pressure sensor assembly of claim 33, further comprising at least one diaphragm positioned over the at least one cavity.

40. A pressure sensor assembly, comprising:
at least one substrate;
a first receive antenna array disposed on the at least one substrate;
a second receive antenna array disposed on the at least one substrate;
a diode disposed on or within the at least one substrate, wherein the diode is coupled to both the first receive antenna array and the second receive antenna array;
a first microstrip feed that connects the first receive antenna array and the second receive antenna array to the diode;
a transmit antenna array disposed on the at least one substrate, wherein the transmit antenna array is coupled to the diode; and
a second microstrip feed that connects the transmit antenna array to the diode, wherein the second microstrip feed differs from the first microstrip feed.

* * * * *